United States Patent
Sakairi

(12) 
(10) Patent No.: US 6,570,649 B2
(45) Date of Patent: May 27, 2003

(54) OPTICAL FIBER CHARACTERISTICS MEASURING DEVICE AND OPTICAL FIBER CHARACTERISTICS MEASURING METHOD

(75) Inventor: Yoshiyuki Sakairi, Tokyo (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 09/820,725

(22) Filed: Mar. 30, 2001

(65) Prior Publication Data

US 2001/0043324 A1 Nov. 22, 2001

(30) Foreign Application Priority Data

Mar. 30, 2000 (JP) .................................... 2000-093839

(51) Int. Cl.[7] .............................................. G01N 21/00
(52) U.S. Cl. .................................................... 356/73.1
(58) Field of Search ...................... 356/73.1; 359/135, 359/158, 136, 118, 177, 127; 385/24, 46, 43, 77, 85

(56) References Cited

U.S. PATENT DOCUMENTS

| | | | |
|---|---|---|---|
| 4,737,026 A | | 4/1988 | Dalgoutte et al. |
| 4,989,971 A | * | 2/1991 | McDonald .................. 356/73.1 |
| 5,099,471 A | * | 3/1992 | Tsukada et al. ............. 359/135 |
| 5,159,400 A | | 10/1992 | Takeda et al. |

FOREIGN PATENT DOCUMENTS

GB   2 248 990 A   4/1992

* cited by examiner

*Primary Examiner*—Tu T. Nguyen
(74) *Attorney, Agent, or Firm*—Burns, Doane, Swecker & Mathis L.L.P.

(57) ABSTRACT

An optical fiber characteristics measuring device includes a pulse driving circuit, a first optical directional coupler, a second optical directional coupler, a third optical directional coupler, a photoelectric transducer, and a bias circuit. The frequency of the backward scattered light is detected based on the electric signal in the device.

4 Claims, 2 Drawing Sheets

OPTICAL FIBER CHARACTERISTICS MEASURING DEVICE AND OPTICAL FIBER CHARACTERISTICS MEASURING METHOD

This application claims priority under 35 U.S.C. §§119 and/or 365 to 2000-093839 filed in Japan on Mar. 30, 2000; the entire content of which is hereby incorporated by reference.

BACKGROUND OF THE INVENTION

1. Field of the Invention

The present invention relates to an optical fiber characteristics measuring device and an optical fiber characteristics measuring method, particularly, a driving control for a laser diode.

This application is based on Japanese Patent Application No. 2000-93839, the contents of which are incorporated herein by reference.

2. Description of Related Art

FIG. 2 shows the structure of a conventional optical characteristics measuring device. In FIG. 2, a laser diode 102 emits a continuous light by a laser diode driving circuit 100, and the continuous light is branched into a reference light and a signal light in a first optical directional coupler 104. The signal light is modulated by light intensity modulation in an optical switch 106 so as to become a pulse light from the continuous light. In this state, since the continuous light and the pulse light are both required to have the same frequency, the optical switch 106 is used to carry out as the light intensity modulation.

In the optical switch 106, a bias voltage and drift must be controlled. Furthermore, an extinction ratio of the signal light is approximately 15 to 30 dB. If an extinction ratio is required which is larger than the above extinction ratio which results when only one optical switch is provided, several optical switches must be inserted in the device.

Therefore, in the conventional optical characteristics measuring device, if a large insertion loss (for example, 5 dB or larger) or a delayed response time of a control signal (for example, 3 ns or longer) is generated depending on the optical switch, a pulse light having a short pulse width (10 ns or shorter) cannot be generated. Furthermore, since the characteristics of the optical fiber depend on the polarization of light, then the polarization of light must be controlled.

The optical switch 106 modulates the continuous light into the pulse light, the pulse light is amplified by an optical fiber amplifier 108, and further the amplified pulse light is sent as a pulse signal to an optical fiber 116 to be measured via a second optical directional coupler 110. A backward scattered light, which is the signal light returned from the optical fiber 116, and the reference light are coupled in a third optical directional coupler 112, so that the backward scattered light having low optical power can be detected by a photoelectric transducer 114.

However, as described above, although it is necessary for the pulse light and the continuous light to have the same frequency (wavelength), it is difficult to manufacture or control the laser diodes so that each has exactly the same frequency. If the continuous light is emitted by a single laser diode and the pulse light and another continuous light are obtained from the continuous light, an optical switch and an optical fiber amplifier for pulse amplification are required. Furthermore, there are many difficult problems such as control of the bias voltage and drift which may be generated in the optical switch, and an improvement of the pulse amplification characteristics of the optical fiber amplifier.

Moreover, it is difficult to attain amplification of the pulse light by the optical fiber amplifier, especially, when the duty ratio is large. When the signal light is continuously input into the optical fiber amplifier, the pulse light is in a stable state; however, when the signal light is intermittently input into the optical fiber amplifier, that is, when the pulse period of the signal light is long, the pulse light is in an unstable state. In this state, energy is stored in the optical fiber amplifier and the stored energy is output all at once just when the signal light is input into the optical fiber amplifier. Then, the pulse light has a form like a sawtooth wave and becomes unstable. As the time when the signal light is not emitted between each pulse or when no signal light is input into the optical fiber amplifier becomes longer and longer, energy is stored in the optical fiber amplifier, and therefore, the duty ratio of the signal pulse light may be set as small as possible.

BRIEF SUMMARY OF THE INVENTION

In light of the above-mentioned problems, an object of the present invention is to provide an optical fiber characteristics measuring device and an optical fiber characteristics measuring method, in which a pulse light and a continuous light, both having the same frequency, are obtained at the same time, and thereby the number of optical parts is reduced and control is simplified.

To achieve the above-mentioned object, according to the first aspect of the present invention, an optical fiber characteristics measuring device is provided, comprising: a pulse driving circuit for supplying a pulse driving current into a laser diode; a first optical directional coupler for branching the light output from the laser diode into a signal light and a reference light; a second optical directional coupler for sending the signal light to an optical fiber to be measured and for branching a returned light from the optical fiber into a backward scattered light and the signal light; a third optical directional coupler for incorporating the reference light output from the first optical directional coupler and the backward scattered light output from the second optical directional coupler and for coupling the backward scattered light onto the reference light; a photoelectric transducer for converting an optical signal output from the third optical directional coupler into an electric signal and for outputting the electric signal; and a bias circuit for supplying a continuous driving current to the laser diode at all times, wherein the frequency of the backward scattered light is detected based on the electric signal.

According to the above device, since the bias circuit which supplies a continuous driving current to the laser diode at all times is provided, the laser diode itself is always emitting. Therefore, the pulse light generated by the laser diode pulse driving circuit and the continuous light generated from the bias circuit are obtained at the same time. Furthermore, since the optical switch and the optical fiber amplifier for the pulse amplification are not required, control of the bias voltage and the drift of the optical switch are not required. Therefore, in the optical fiber characteristics measuring device in which it is required that the pulse light and the continuous light each have the same frequency, the optical structures are simplified. Furthermore, since the laser diode itself always emits light, chirping is prevented.

Furthermore the above-mentioned optical fiber characteristics measuring device may further comprise a delay circuit. The delay circuit is provided between the first optical directional coupler and the second optical directional coupler, and delays the time at which the signal light output from the first optical directional coupler arrives at the third optical directional coupler so as to be later than a timing that the reference light output from the first optical directional coupler arrives at the photoelectric transducer.

According to the above device, since the delay circuit is provided, the detection accuracy when detecting the frequency of the backward scattered light output from the optical fiber to be measured is improved.

Furthermore, the above-mentioned optical fiber characteristics measuring device may further comprise an optical fiber amplifier. The optical fiber amplifier is provided between the first optical directional coupler and the third optical directional coupler in order to amplify the reference light.

According to the above device, since the optical fiber amplifier is provided, an amplified reference light, especially, an amplified continuous light is obtained, and therefore, even if the pulse light has a form like a sawtooth wave, the pulse light remains stable even though the pulse light in a conventional optical fiber characteristics measuring device becomes unstable when having the form of a sawtooth wave.

According to the second aspect of the present invention, an optical fiber characteristics measuring method is provided, comprising the steps of: supplying a pulse drive current into a laser diode; supplying a continuous driving current into the laser diode with the pulse drive current; branching light output from the laser diode into a signal light and a reference light; inputting the signal light into an optical fiber to be measured; coupling the reference light onto a backward scattered light returned from the optical fiber to form an optical signal, converting the optical signal into an electric signal; and detecting the frequency of the backward scattered light based on the electric signal.

According to the above method, since the continuous driving current is supplied in addition to the pulse drive current into the laser diode, the pulse light and the continuous light are obtained at the same time. Furthermore, since the optical switch and the optical fiber amplifier for the pulse amplification are not required, control of the bias voltage and the drift of the optical switch are not required. Therefore, in the optical fiber characteristics measuring device in which it is required that the pulse light and the continuous light each have the same frequency, the optical structures are simplified. Furthermore, since the laser diode itself always emits light, chirping is prevented.

According to the present invention, the pulse light and the continuous light, both having the same frequency, are obtained at the same time, and thereby, the number of optical parts in the optical fiber characteristics measuring device is reduced and control is simplified.

BRIEF DESCRIPTION OF THE SEVERAL VIEWS THE DRAWINGS

DETAILED DESCRIPTION OF THE INVENTION

Figure 1:
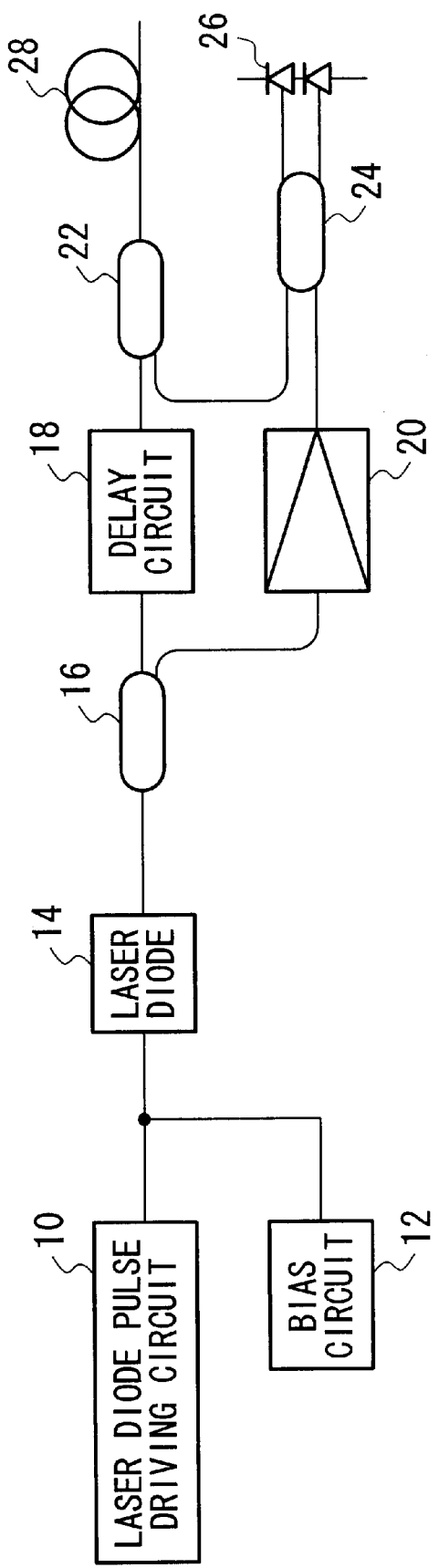
FIG. 1 is a block diagram showing an optical fiber characteristics measuring device according to one embodiment of the present invention.
Figure 2:
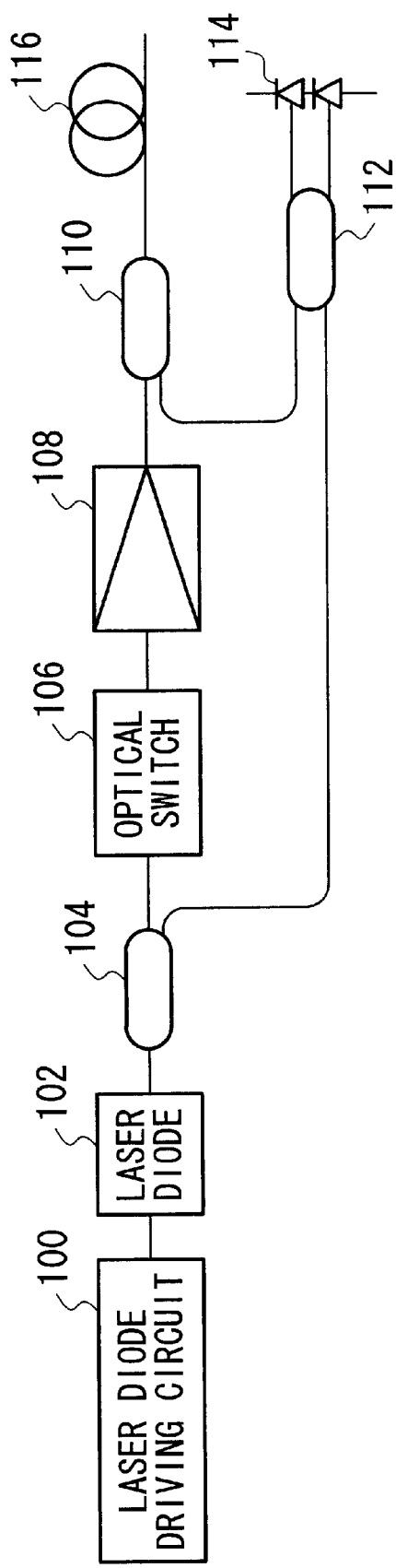
FIG. 2 is a block diagram showing a conventional optical fiber characteristics measuring device.

One embodiment of the optical fiber characteristics measuring device according to the present invention will be explained with reference to FIG. 1. In FIG. 1, the optical fiber characteristics measuring device comprises a laser diode pulse driving circuit 10, a bias circuit 12, a laser diode 14, a first optical directional coupler 16, a delay circuit 18, an optical fiber amplifier 20, a second optical directional coupler 22, a third optical directional coupler 24, and a photoelectric transducer 26. The laser diode pulse driving circuit 10 supplies a pulse current to the laser diode 14. The bias circuit 12 supplies a constant bias current to the laser diode 14 at all times. The first optical directional coupler 16 branches light output from the laser diode into a signal light and a reference light. The delay circuit 18 delays the signal light and the optical fiber amplifier 20 amplifies the reference light. The second optical directional coupler 22 sends the signal light to an optical fiber 28 which is to be measured and branches a returned light from the optical fiber 28 into a backward scattered light. The third optical directional coupler 24 incorporates the reference light output from the first optical directional coupler 16 via the optical fiber amplifier 20 and the backward scattered light output from the second optical directional coupler 22, and couples the backward scattered light onto the reference light. The photoelectric transducer 26 converts an optical signal output from the third optical directional coupler 24 into an electric signal. The laser diode pulse driving circuit 10 is used as the pulse driving circuit.

According to the above-mentioned structure, the laser diode 14 is driven by driving current supplied by the laser diode pulse driving circuit 10 and the bias circuit 12. The light emitted from the laser diode 14 is branched into the signal light and the reference light by the first optical directional coupler 16. The signal light is input into the second optical direction coupler 22 via the delay circuit 18. The second optical directional coupler 22 outputs the signal light to the optical fiber 28, branches the returned light from the optical fiber 28 to be measured into the backward scattered light and the signal light, and further outputs the backward scattered light to the third optical directional coupler 24.

The reference light output from the first optical directional coupler 16 is amplified by the optical fiber amplifier 20 and is output to the third optical directional coupler 24. In the third optical directional coupler 24, the reference light and the backward scattered light output by the second optical directional coupler 22 are coupled; as a result, an optical signal is obtained, and thereafter, this optical signal is output to the photoelectric transducer 26. The input optical signal is converted into an electric signal in the photoelectric transducer 26. Using this electric signal, the frequency of the backward scattered light is determined.

The laser diode 14 is driven by the pulse current output from the laser diode pulse driving circuit 10. When the pulse light emitted from the laser diode 14 is in a pulse base between pulse peaks, the optical power (light intensity) is low. In order to emit light from the laser diode 14 at all times, a small amount of driving current is supplied to the laser diode 14. In order to supply this small amount of driving current to the laser diode 14, the bias circuit 12 is connected so as to be in parallel with the laser diode pulse driving circuit 10 and supplies a predetermined small amount of driving current to the laser diode 14. By supplying the predetermined small amount of driving current to the laser diode 14, a light consisting of a pulse peak (+15 dBm) and a pulse base (−30 dBm), and a continuous light (−30 dBm) are obtained. The optical power (light intensity) of the obtained pulse base and the obtained continuous light is very low; therefore, the light emitted from the laser diode 14 is branched into the signal light and the reference light by the first optical directional coupler 16, and thereafter, the reference light is amplified by the optical fiber amplifier 20 so as to mainly amplify the continuous light in the reference light in order to amplify the pulse base.

Conventionally, if the bias circuit 12 is not provided, a class C amplification is conducted (current does not flow if there is no input signal) in the last stage transistor in the laser diode pulse driving circuit 10. On the other hand, in this embodiment of the present invention, if the bias circuit 12 is not provided, a class AB amplification may be conducted (a small amount of current flows even if there is no input signal). When this latter type of amplification is conducted, a small amount of driving current can be supplied to the laser diode 14 at all times.

In the laser diode pulse driving circuit 10, a control signal is generated so that the pulse light has, for example, a frequency of 40 $\mu$s and a pulse width of 100 ns and is supplied to the laser diode 14. Furthermore, the bias circuit 12 maintains the supply of a small amount of driving current to the laser diode 14 regardless of the optical power of the pulse light. The laser diode 14 having, for example, a wavelength of 1.55 $\mu$m or 1.3 $\mu$m and a spectrum line width with a peak frequency of approximately 1 MHz is preferably used.

As a preferable example, the first optical direction coupler 16 has a branching ratio of 9:1 (the ratio of the signal light to the reference light), the second optical direction coupler 22 has a branching ratio of 5:5, and the third optical direction coupler 24 has a branching ratio of 5:5. The branching ratio in the first optical direction coupler 16 is not limited; however, the signal light is preferably larger than the reference light so that the optical power (light intensity) of the pulse light in the signal light is not decreased. The backward scattered light has low optical power and a frequency of 10 GHz. A double balance type photoelectric transducer whose frequency band is 10 GHz or larger may be used, as the photoelectric transducer 26, in order to detect low optical power. Accordingly, in the third optical directional coupler 24, the coupled light must be accurately branched into the optical signal according to the predetermined branching ratio.

One example of the optical fiber amplifier 20 is preferably used in this embodiment is an Erbium-doped optical fiber amplifier. Either 1.48 $\mu$m or 0.98 $\mu$m of one or both excitation light sources is preferably used in the amplifier. An amplification degree is set so that each optical power of the continuous light and the pulse base is approximately 0 dBm. The length of the optical fiber is set to 150 m in the delay circuit 18 in order to delay the signal light for 1.5 $\mu$s in consideration of the delay of the reference light in the optical fiber amplifier 20, the pulse width, and the like.

When the pulse width of the signal light is 100 ns, the width of pulse light propagated in the optical fiber is 10 m. A length of approximately 20 to 60 m of optical fiber, into which Erbium is placed, is inserted into the optical fiber amplifier 20. Due to this long length of the optical fiber, the time at which that the reference light output from the first optical directional coupler 16 arrives at the photoelectric transducer 26 is later than the time at which that the signal light output from the first optical directional coupler 16 arrives at the third optical directional coupler 24, and as a result, a time lag is generated. To prevent the generation of a time lag of the reference light or the detection of the frequency of the backward scattered light before the frequency of the reference light, after the signal light is output from the second optical directional coupler 22 to the optical fiber 28 which is to be measured, the detection for the frequency is not conducted for a predetermined time. For example, in this embodiment, the detection for the frequency is not conducted for approximately 600 ns.

In this embodiment of the present invention, the delay circuit 18 is provided in the path of the signal light; preferably, the delay circuit 18 is provided between the first optical directional coupler 16 and the second optical directional coupler 22. The delay circuit 18 delays the time at which the signal light is output from the second optical directional coupler 22 to the optical fiber 28 so that the reference light is input beforehand into the photoelectric transducer 26 via the optical fiber amplifier 20 and the third optical directional coupler 24.

If the optical fiber amplifier 20 is provided between the laser diode 14 and the first optical directional coupler 16, it is necessary that the optical fiber amplifier 20 has an amplification degree of 40 dB because the optical power (light intensity) of the continuous light needs to be 0 dBm. However, since the pulse light already has an optical power (light intensity) of +15 dB, even if the pulse light is amplified with an amplification degree of +30 dB by the optical fiber amplifier 20, the optical power (light intensity) of the pulse light becomes saturated and becomes approximately +30 dBm, that is, the increment is only 15 dB in spite of the amplification degree of +30 dB. Therefore, the extinction ratio of the optical power (light intensity) of the pulse light to the optical power (light intensity) of the continuous light is approximately 30 dB. Since the laser diode 14 emits light at an extinction ratio of 40 dB, the extinction ratio deteriorates approximately 10 dB due to an effect of the optical fiber amplifier 20. If the optical power of the pulse light is required to be +30 dBm, then the optical fiber amplifier 20 is preferably provided between the laser diode 14 and the first optical directional coupler 16.

On the other hand, according to this embodiment as described above, since the optical fiber amplifier 20 is provided in the path of the reference light output from the first optical directional coupler 16, the output pulse light to be detected can have an extinction ratio of 40 dB or larger, and the optical power (light intensity) of the output continuous light or the pulse base can be 0 dBm.

In the third optical directional coupler 24, the backward scattered light emitted from the second optical directional coupler 22 and the reference light output from the first optical directional coupler 16 couple together, and the coupled light is output from the third optical directional coupler 24 to the photoelectric transducer 26. The backward scattered light has low optical power; however, as described above, by coupling with the reference light, the frequency of the backward scattered light can be determined.

Furthermore, if the laser diode 14 is modulated with high-speed, a plural pulse of a longitudinal mode is generated. Additionally, chirping, that is, a phenomena wherein the oscillation wavelength varies with time, is generated. According to the optical fiber characteristics measuring device of this embodiment, since the driving current is always supplied to the laser diode 14, the laser diode 14 itself emits light at all times, and therefore, chirping cannot be generated.

According to the present invention, the pulse light and the continuous light, both having the same frequency, can be obtained at the same time, the number of optical parts in the optical fiber characteristics measuring device can be reduced, and control can be simplified.

Although only one embodiment of the present invention is explained above, the present invention is not limited to this embodiment and various embodiments can be made.

What is claimed is:

1. An optical fiber characteristics measuring device comprising:
   a pulse driving circuit for supplying a pulse driving current having a long pulse period and a duty ratio larger than 2000:1 to a laser diode which concurrently emits a pulse light and continuous light having the same frequency;
   a bias circuit for supplying a continuous driving current to the laser diode at all times during operation;
   a first optical directional coupler for branching the light output from the laser diode into a signal light arid a reference light;
   a second optical directional coupler for sending the signal light to an optical fiber to he measured and for branching a returned backward scattered light front the optical fiber into a third optical directional coupler;
   the third optical directional coupler for incorporating the reference light output from the first optical directional coupler and the backward scattered light output from the second optical directional coupler and coupling the backward scattered light onto the reference light; and
   a photoelectric transducer for converting an optical signal output from the third optical directional coupler into an electric signal and for outputting the electric signal;
   wherein the frequency of the backward scattered light is detected based on the electric signal.

2. An optical fiber characteristics measuring device according to claim 1, further comprising a delay circuit provided between the first optical directional coupler and the second optical directional coupler for delaying the time at which the backward scattered light output from the second optical directional coupler arrives at the third optical directional coupler to be later than the time at which the reference light output from the first optical directional coupler arrives at the photoelectric transducer.

3. An optical fiber characteristics measuring device according to claim 1, further comprising an optical fiber amplifier provided between the first optical directional coupler and the third optical directional coupler in order to amplify the reference light.

4. An optical fiber characteristics measuring method comprising the steps of:
   supplying a pulse drive current having long pulse period and having duty ratio longer than 2000:1 to a laser diode;
   supplying continuous driving current at all time during operation into the laser diode together with the pulse drive current;
   concurrently emitting pulse light and continuous light by the laser diode;
   branching light output from the laser diode into a signal light and a reference light;
   inputting the signal light into an optical fiber to be measured;
   coupling the reference light onto a backward scattered light returned from the optical fiber to form an optical signal;
   converting the optical signal into an electric signal; and
   detecting the frequency of the backward scattered light based on the electric signal.

* * * * *